United States Patent
Ridgway et al.

(10) Patent No.: US 8,375,822 B2
(45) Date of Patent: Feb. 19, 2013

(54) ENERGY ABSORBING DEVICE FOR A COLLAPSIBLE STEERING COLUMN ASSEMBLY

(75) Inventors: Jason R. Ridgway, Bay City, MI (US); Albert Clifford Huber, Montrose, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 460 days.

(21) Appl. No.: 12/790,782

(22) Filed: May 28, 2010

(65) Prior Publication Data
US 2010/0300238 A1    Dec. 2, 2010

Related U.S. Application Data

(60) Provisional application No. 61/217,465, filed on May 29, 2009.

(51) Int. Cl.
*B62D 1/18* (2006.01)
(52) U.S. Cl. ............................ 74/493; 280/775; 280/777
(58) Field of Classification Search ..................... 74/492, 74/493; 280/775, 777
See application file for complete search history.

(56) References Cited

U.S. PATENT DOCUMENTS

| | | | |
|---|---|---|---|
| 5,562,307 A | 10/1996 | Connor | |
| 5,961,146 A * | 10/1999 | Matsumoto et al. | 280/777 |
| 6,224,104 B1 * | 5/2001 | Hibino | 280/777 |
| 6,322,103 B1 * | 11/2001 | Li et al. | 280/777 |
| 6,799,486 B2 * | 10/2004 | Manwaring et al. | 74/493 |
| 7,275,765 B2 * | 10/2007 | Camp et al. | 280/777 |
| 7,325,834 B2 * | 2/2008 | Manwaring et al. | 280/777 |
| 7,780,196 B2 * | 8/2010 | Cymbal et al. | 280/777 |
| 8,033,574 B2 * | 10/2011 | Menjak et al. | 280/777 |

* cited by examiner

*Primary Examiner* — David M Fenstermacher
(74) *Attorney, Agent, or Firm* — Cantor Colburn LLP

(57) ABSTRACT

A collapsible steering column assembly includes a mounting bracket configured for mounting to a vehicle, the bracket having a front portion and a back portion, the front portion comprising a pair of spaced arms, each arm having an inner surface that opposes the inner surface of the other and an opposed outer surface. The assembly also includes a steering column having a longitudinal axis and comprising an inner jacket that is slidably disposed within the outer jacket between the spaced arms. The assembly further includes a locking device that passes through the spaced arms and the outer jacket, the locking device movable to lock or unlock the slidable disposition of the inner jacket within the outer jacket. Still further, the assembly includes an energy absorbing device comprising an energy absorbing strap that is fixed to the inner jacket at a first portion thereof and slidably disposed within the outer jacket.

18 Claims, 7 Drawing Sheets

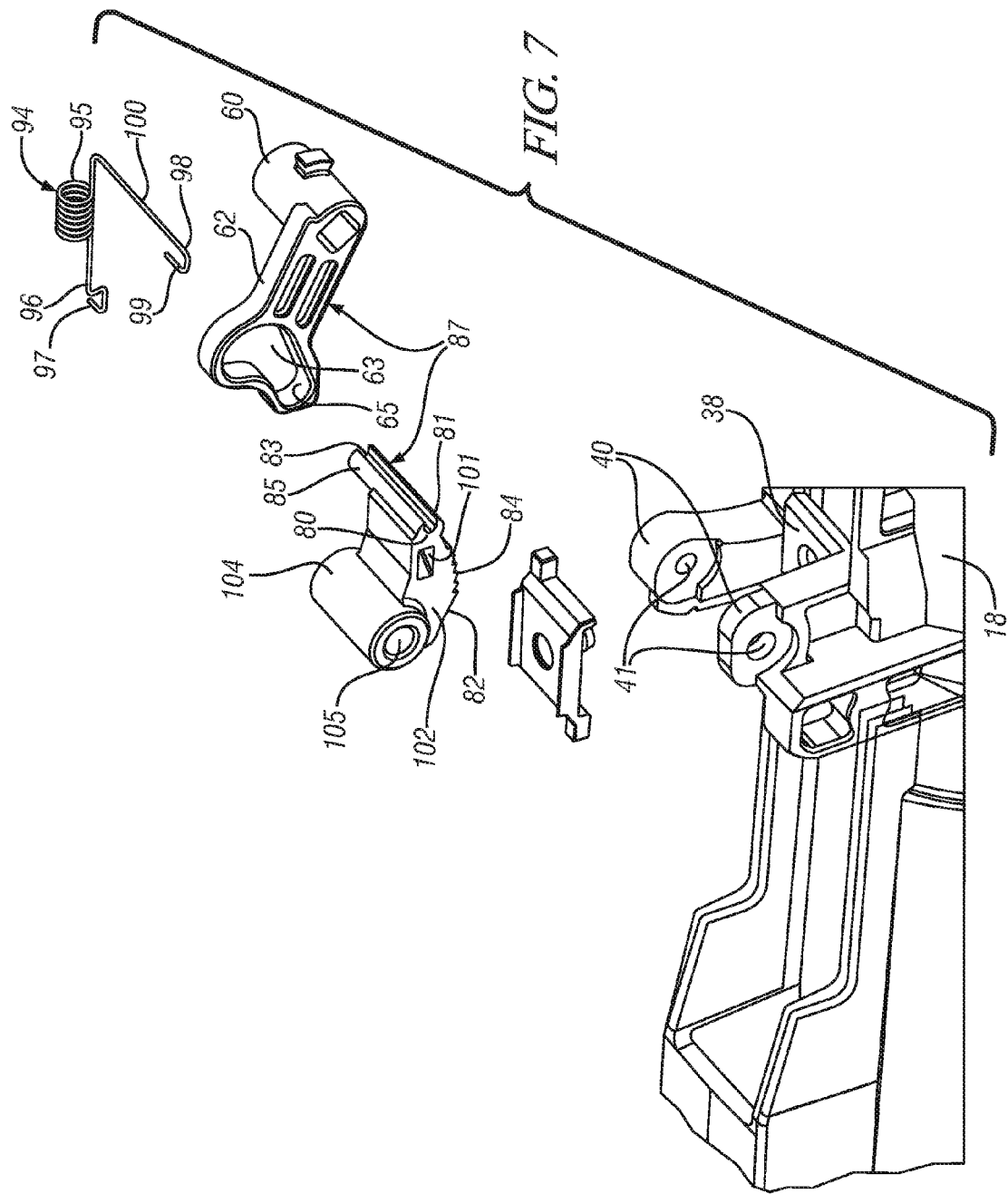

ENERGY ABSORBING DEVICE FOR A COLLAPSIBLE STEERING COLUMN ASSEMBLY

CROSS-REFERENCES TO RELATED APPLICATIONS

This patent application claims priority to U.S. Provisional Patent Application Ser. No. 61/217,465 filed May 29, 2009 which is incorporated herein by reference in its entirety.

FIELD OF THE INVENTION

The subject invention relates to an energy absorbing device for a collapsible steering column assembly for a vehicle.

BACKGROUND

Steering columns are disposed in vehicles to support the steering wheel for use by the driver. Adjustable steering columns are disposed to enable the driver to change the position of the steering wheel to enhance safe, comfortable and convenient turning of the wheel and steering of the vehicle. Raking movement and tilting movement change the angular position of the steering wheel. Telescoping movement changes the axial position of the steering wheel along the center axis of the steering column relative to the dashboard, the steering wheel moving outward or inward from the dashboard. Adjustable steering columns include locks to prevent movement of the steering wheel after the desired position of the steering wheel has been established. Such columns are also collapsible to facilitate axial movement and absorption and dissipation of energy in an extreme impact event. This absorption and dissipation of energy may be accomplished by the use of an energy absorbing device, such as an energy absorbing strap.

The use of energy absorbing straps in adjustable, collapsible steering columns requires a cost-effective means of axially constraining the steering column energy absorbing strap over a defined range of movement of the column while also preserving a wide range of adjustability, preferably as large a number of adjustment positions as possible, and more preferably an infinite number of adjustment positions. Current energy absorbing strap designs generally place the strap in a fixed location to ensure its proper function. Thus, the collapsible column members must either remain fixed with respect to their pre-collapse or pre-stroke positions or the energy absorbing strap is only engaged at a predefined position of the column members.

Accordingly, it is desirable to provide adjustable, collapsible steering columns that have improved adjustability and operability over a wide range of adjustment positions.

SUMMARY OF THE INVENTION

In one exemplary embodiment, a collapsible steering column assembly is disclosed. The assembly includes a column mounting bracket configured for mounting to a vehicle, the bracket having a front portion and a back portion, the front portion comprising a pair of spaced arms, each arm having an inner surface that opposes the inner surface of the other and an opposed outer surface. The assembly also includes a steering column having a longitudinal axis and comprising an inner jacket that is slidably disposed within an inner surface of the outer jacket, an outer surface of the outer jacket located adjacent the inner surfaces of the spaced arms. The assembly further includes a locking device that passes through and is coupled to the spaced arms and the outer jacket, the locking device movable to lock or unlock the slidable disposition of the inner jacket within the outer jacket by respective application or release of a predetermined clamping force to the outer surfaces of the arms, outer bracket and inner bracket. Still further, the assembly includes an energy absorbing device comprising an energy absorbing strap that is fixed to the inner jacket at a first portion thereof and slidably disposed within the outer jacket.

In another exemplary embodiment, a collapsible steering column assembly is disclosed. The assembly includes a column mounting bracket configured for mounting to a vehicle, the bracket having a front portion and a back portion, the front portion comprising a pair of spaced arms, each arm having an inner surface that opposes the inner surface of the other and an opposed outer surface. The assembly also includes a steering column having a longitudinal axis and comprising an inner jacket that is slidably disposed within an inner surface of the outer jacket, an outer surface of the outer jacket located adjacent the inner surfaces of the spaced arms. The assembly further includes a locking device that passes through and is coupled to the spaced arms and the outer jacket, the locking device movable to lock or unlock the slidable disposition of the inner jacket within the outer jacket by respective application or release of a predetermined clamping force to the outer surfaces of the arms, outer bracket and inner bracket. Still further, the assembly includes an energy absorbing device comprising an energy absorbing strap that is fixed to the inner jacket at a first portion thereof and slidably disposed within the outer jacket, an anvil disposed on the inner jacket, the anvil disposed proximate the first portion of the strap and configured to engage the strap upon collapse of the inner jacket within the outer jacket, a locking member that is disposed on the outer jacket, a second portion of the strap located proximate the locking member, the locking member selectively engageable to lock the second portion of the strap with respect to the outer jacket and a bias member providing a bias force urging the locking member into engagement with the second portion of the strap.

The above features and advantages and other features and advantages of the present invention are readily apparent from the following detailed description of the invention when taken in connection with the accompanying drawings.

BRIEF DESCRIPTION OF THE DRAWINGS

Other objects, features, advantages and details appear, by way of example only, in the following detailed description of embodiments, the detailed description referring to the drawings in which:

FIG. 7 is an exploded view of the locking member, biasing member, and linkage of FIG. 4.

DESCRIPTION OF THE EMBODIMENTS

In accordance with an exemplary embodiment, an adjustable, collapsible steering column is provided which provides an energy absorbing device that includes an energy absorbing strap that is configured to travel with one of the collapsible members of the steering column while the column is being adjusted and may be engaged to provide energy absorption during the collapse of the collapsible members at any of their adjusted positions.

Referring to the FIGS., wherein like numerals indicate like or corresponding parts throughout the several views, an exemplary embodiment of an energy absorbing device 10 for a collapsible steering column assembly 12 for a vehicle (not shown) is illustrated.

Figure 1:
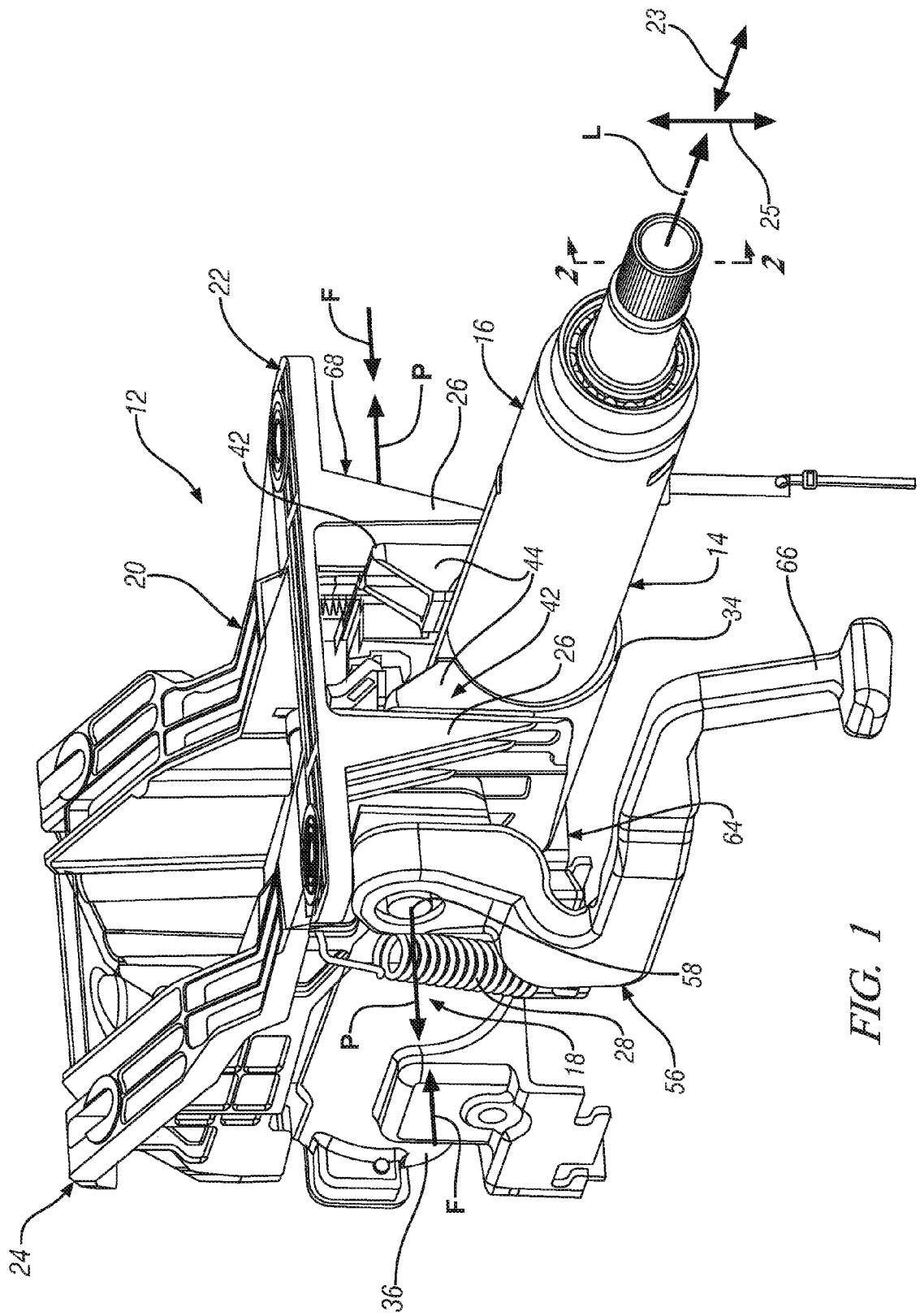
FIG. 1 is a perspective left side view of an exemplary embodiment of an energy absorbing device for a collapsible steering column assembly in a pre-collapse position.
Figure 2:
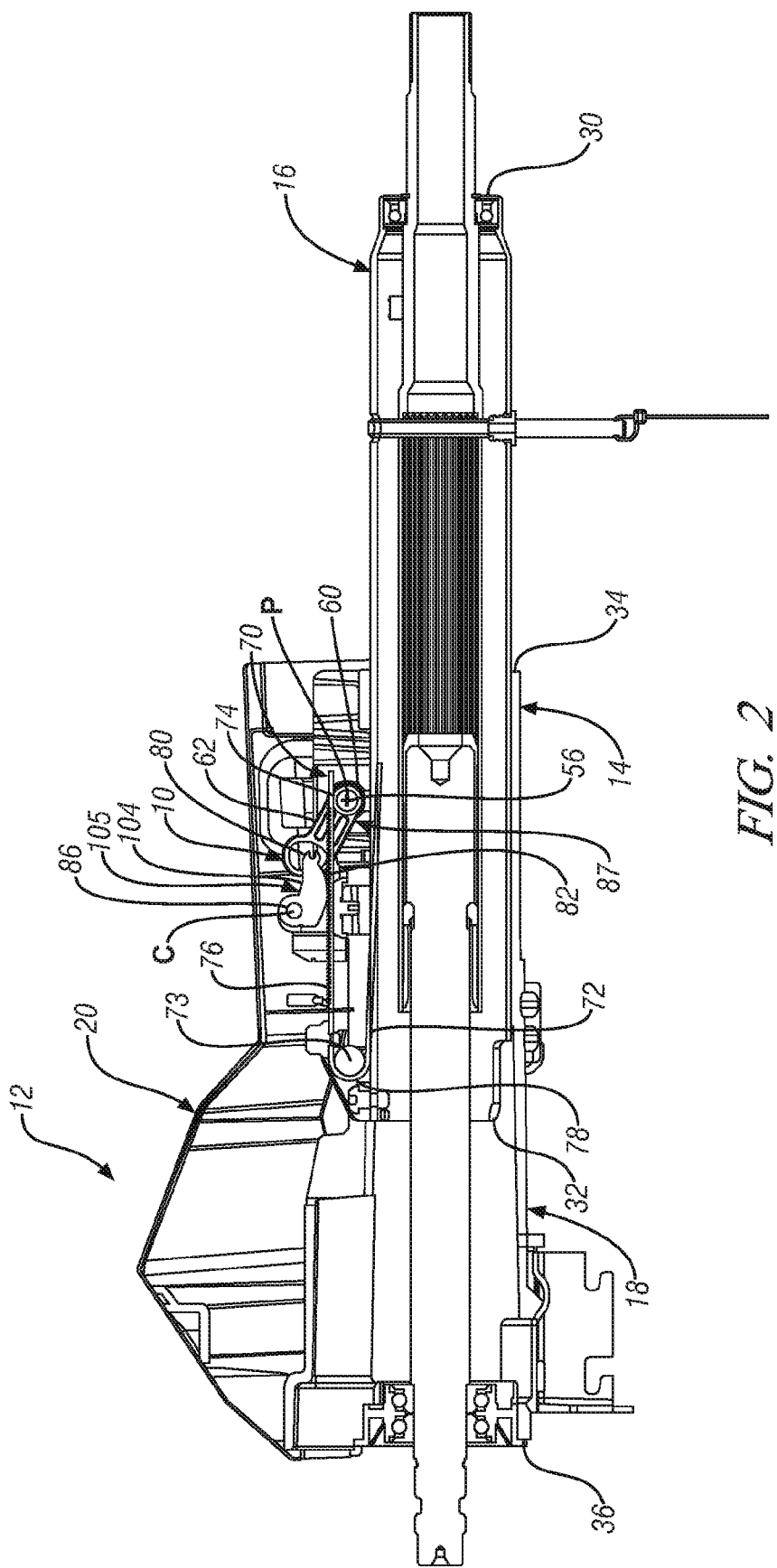
FIG. 2 is a cross-sectional view of the energy absorbing device and the collapsible steering column assembly of FIG. 1 taken along Section 2-2 in a pre-collapse position of the column with the energy absorbing device in a locked position.
Figure 3:
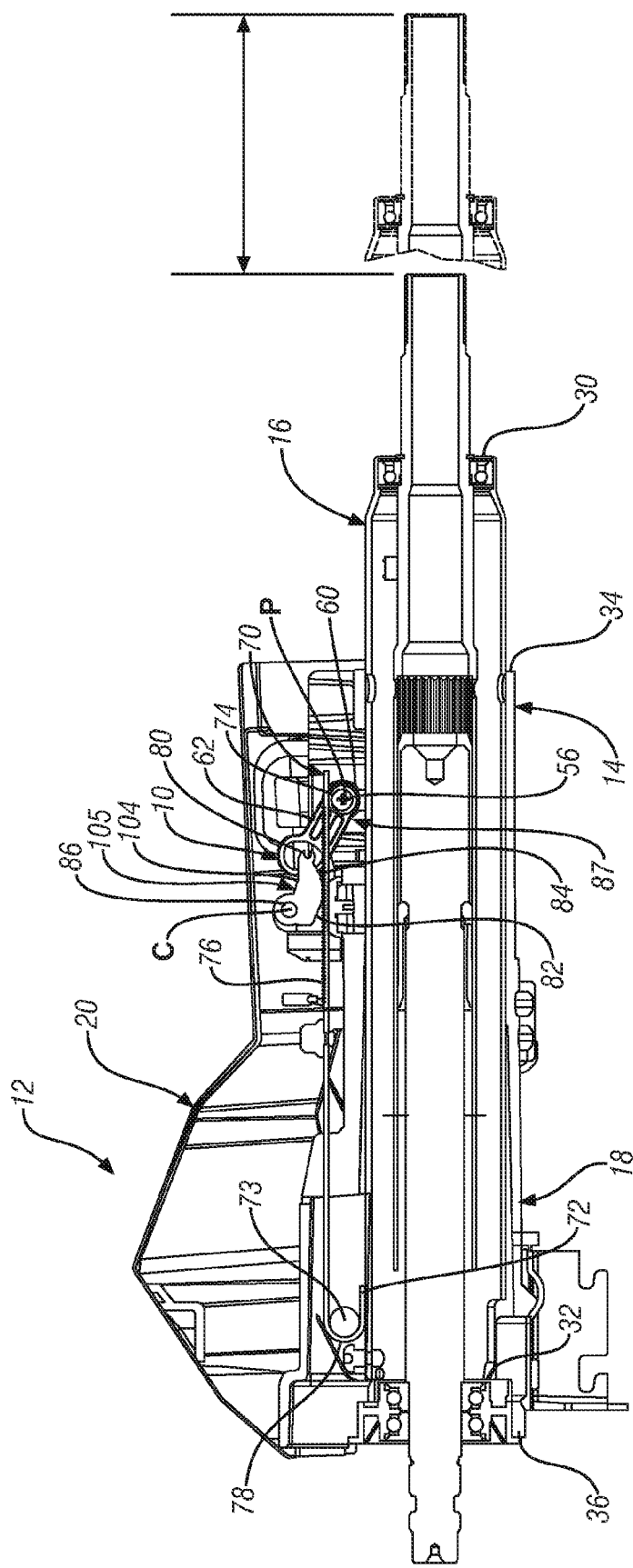
FIG. 3 is a cross-sectional view of the energy absorbing device and the collapsible steering column assembly of FIG. 2 in a post-collapse position with the energy absorbing device in a locked position.

Referring to FIGS. 1-3, the collapsible steering column assembly 12 includes a steering column 14 defining a longitudinal axis "L". The steering column 14 includes an inner jacket 16 and an outer jacket 18 with the inner jacket 16 slidably disposed and/or collapsible within the outer jacket 18 along the longitudinal axis L when a predetermined axial compressive collapse force is applied to the proximal end 30 of the inner jacket 16, such as when the vehicle is in a collision. As shown in FIG. 2, the steering column 14 is shown in a pre-collapse position in which the predetermined force has not been applied. As shown in FIG. 3, the steering column 14 is shown in a post-collapse position in which the predetermined force has been applied. The predetermined force may be any suitable axial compressive collapse force, including a force of about 2000 N. It is to be appreciated that the predetermined force may be higher or lower than 2000 N depending on the design requirements of the vehicle manufacturer. Further, the inner jacket 16 may stroke or travel a predetermined stroke distance "d" of 100 millimeters between the pre-collapse position and the post-collapse position. It is to be appreciated that the inner jacket 16 may travel more or less than 100 millimeters between the pre-collapse position and the post-collapse position depending on the design requirements of the vehicle manufacturer.

As illustrated, for example, in FIG. 1, the steering column 14 is also adjustable in a telescoping direction 23 and a raking (tilting) direction 25. A steering wheel (not shown) is coupled to the inner jacket 16 for allowing a driver to adjust the steering column 14 in the telescoping direction 23 and raking directions 25 within a vehicle compartment (not shown). More specifically, the inner jacket 16 is slidably disposed in the outer jacket 18 along the longitudinal axis L for allowing adjustments in the telescoping direction 23 and the inner and outer jackets 16, 18 move together transverse to the longitudinal axis "L" for movement in the raking direction 25. In other words, the steering wheel moves closer to and away from the driver when adjusting the telescoping direction 23 and the steering wheel moves up and down relative to the driver when adjusting the raking direction 25. Typically, the steering wheel is adjustable in both the telescoping and raking directions 23, 25. It is to be appreciated that the steering wheel may be adjustable only in the telescoping direction 23 or only in the raking direction 25.

Referring to FIG. 1, the collapsible steering column assembly 12 further includes a column mounting bracket 20 affixed to the vehicle and coupled to the inner and outer jackets 16, 18 for supporting the inner and outer jackets 16, 18. The bracket 20 includes a front portion 22 and a back portion 24 spaced from each other relative to the longitudinal axis L. The front portion 22 of the bracket 20 includes a pair of opposed arms 26 extending downwardly and spaced from each other transverse to the longitudinal axis L. The arms 26 flank the outer jacket 18 and more specifically, the inner and outer jackets 16, 18 are disposed between the arms 26 and are releasably coupled to the arms 26. It is to be appreciated that the front and back portions 22, 24 may be integrally formed with the bracket 20 or affixed to each other by any suitable permanent joint, such as various welds, or by the use of various joining devices, such as various types of fasteners, etc. It is to be further appreciated that the arms 26 may be integrally formed with the front portion 22 or formed separately and affixed to the front portion 22 by any suitable permanent joint, such as various welds, or by the use of various fasteners, etc.

The collapsible steering column assembly 12 further includes a biasing member 28 attached to the outer jacket 18 and one of the arms 26 and another biasing member 28 attached to the outer jacket 18 and the other one of the arms 26 for preventing the steering wheel from inadvertently dropping down toward the driver's legs during adjustments. The biasing member 28 may include a coil spring.

As shown in FIGS. 2 and 3, the inner jacket 16 includes a proximal end 30 and a distal end 32 with the steering wheel (not shown) coupled to the proximal end 30. The outer jacket 18 includes a first end 34 and a second end 36 spaced from each other relative to the longitudinal axis L with the distal end 32 of the inner jacket 16 slidably disposed within the first end 34 of the outer jacket 18. The second end 36 of the outer jacket 18 is coupled to the back portion 24 of the bracket 20 such that the steering column 14 may pivot transverse to the longitudinal axis L relative to the bracket 20 in the raking direction 25.

Figure 4:
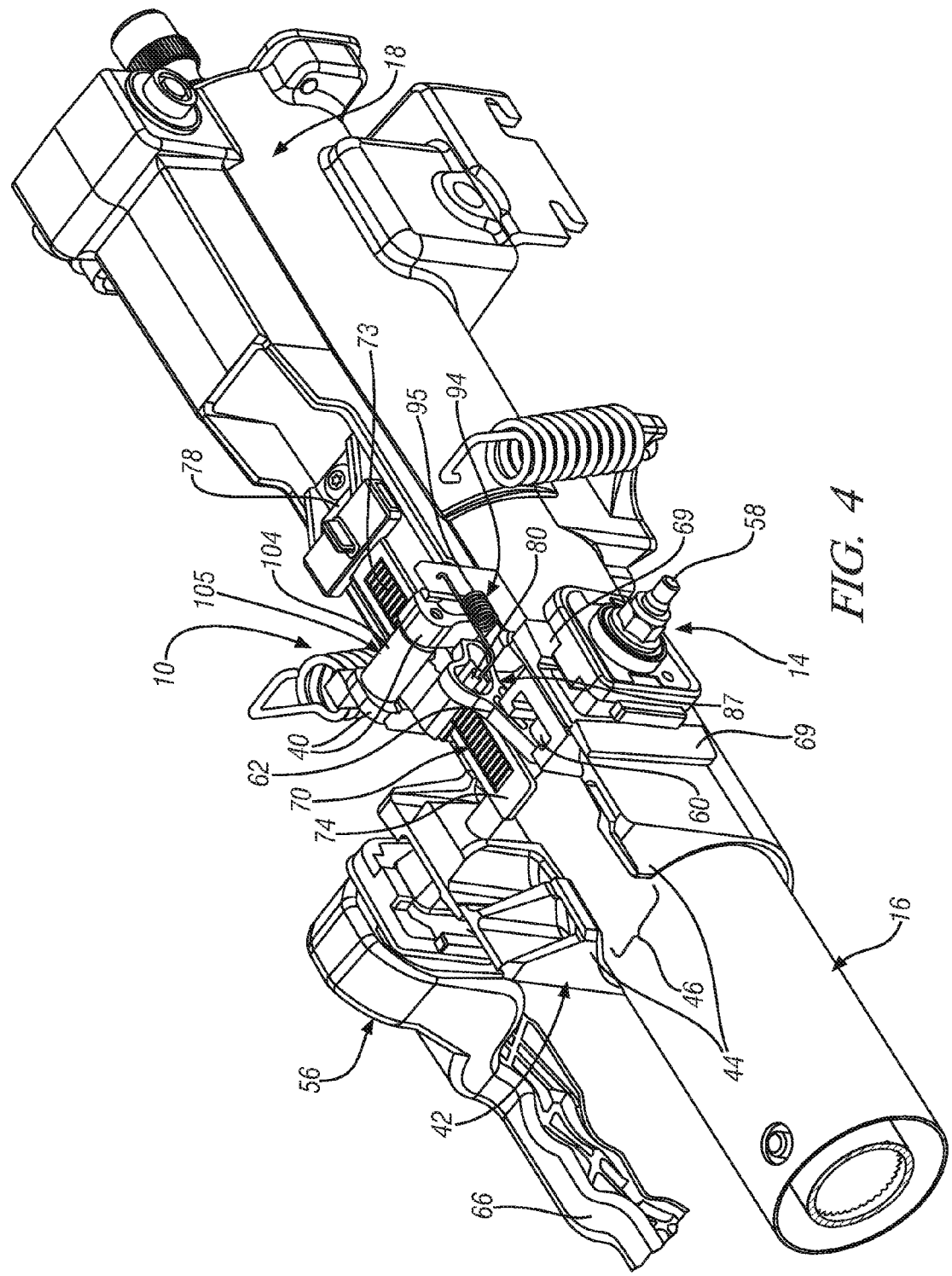
FIG. 4 is a partial perspective right side view of the assembly of the inner jacket, outer jacket and energy absorbing device of FIG. 1 with the energy absorbing device in a locked position.
Figure 5:
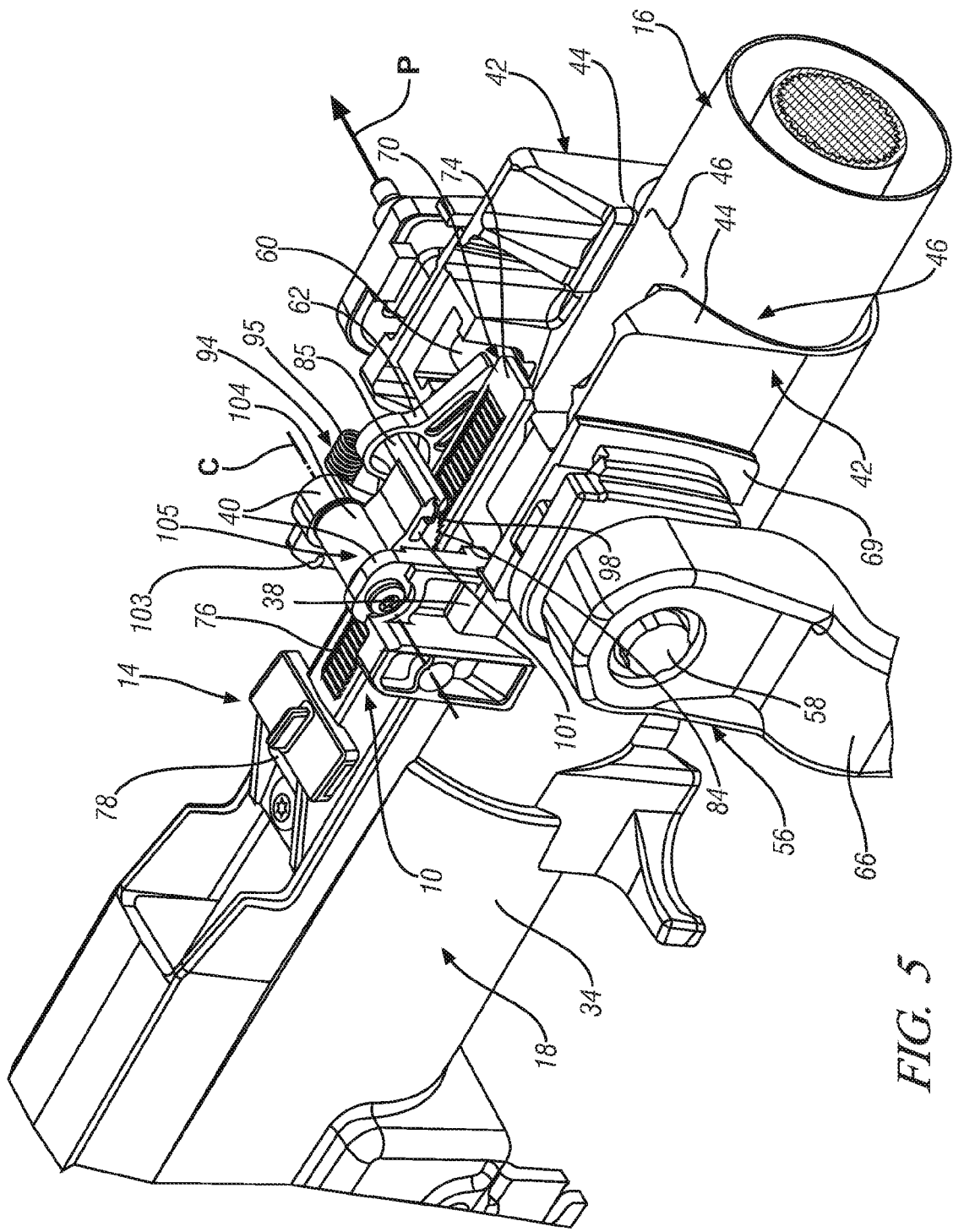
FIG. 5 is a partial enlarged perspective left side view of the assembly of FIG. 4 with the energy absorbing device in a locked position.

Referring to FIGS. 4 and 5, the first end 34 of the outer jacket 18 includes a base 38 has a pair of legs 40 spaced from each other transverse to the longitudinal axis L and extending upwardly from the base 38. It is to be appreciated that the base 38 and the legs 40 may be integrally formed with the outer jacket 18 or affixed to each other by any suitable permanent joint, such as various welds, or by the use of various joining devices, such as various types of fasteners, etc. The base 38 and the legs 40 will be discussed further below in relation to an energy absorbing device 10.

The first end 34 of the outer jacket 18 further includes a pair of side portions 42 spaced from each other relative to the longitudinal axis L and spaced from the legs 40 relative to the longitudinal axis L. Each of the side portions 42 includes a flange 44 extending generally toward the other to define a space 46 between the flanges 44 for allowing the first end 34 of the outer jacket 18 to flex or bend to selectively prevent movement of the inner jacket 16. The flanges 44 are configured to complement the inner jacket 16. In other words, the flanges 44 circumferentially abut the inner jacket 16. It is to be appreciated that the flanges 44 may be integrally formed with the side portions 42 or affixed to one another by any suitable permanent joint, such as various welds, or by the use of various joining devices, such as various types of fasteners, etc.

Referring to FIGS. 1-7, the collapsible steering column assembly 12 further includes a selectively engageable locking device 56 coupled to the outer jacket 18 and the bracket 20 for selectively allowing the driver to adjust the steering wheel in the telescoping and raking directions 23, 25. More specifically, the locking device 56 is coupled to the first end 34 of the outer jacket 18 and the arms 26 of the bracket 20 for selectively allowing adjustments of the inner and outer jackets 16, 18. The locking device 56 includes a rake bolt 58 disposed through the first end 34 of the outer jacket 18 and the arms 26 of the bracket 20. The bolt 58 defines a pivot axis "P" transverse to and radially spaced from the longitudinal axis "L" with the bolt 58 rotatable about the pivot axis "P". The bolt 58 includes a bolt follower 60 that is configured to be coupled to the bolt 58 so that it may be rotated in unison with the bolt. Bolt follower 60 has an arm 62 extending radially away from the pivot axis "P". The arm includes, at a distal end thereof, FIG. 6, an opening 63 having a sidewall 65 that acts as a cam surface as described further herein. The bolt follower 60 is affixed to the bolt 58 such that rotation of the bolt 58 allows rotation of the bolt follower 60. It is to be appreciated that the bolt 58, the bolt follower 60 and the arm 62 may be integrally formed with one another or affixed to each other by any suitable permanent joint, such as various welds, or by the use of various joining devices, such as various types of fasteners, etc.

The locking device 56 may include any suitable locking mechanism, such as, for example, a cam-follower mechanism (not shown) or a tilt-pin mechanism 64 coupled to the bolt 58 for selectively applying an inwardly directed predetermined clamping pressure or force "F" to the bracket 20 and/or the arms 26, the outer jacket 18 and the inner jacket 16 along the pivot axis "P" for selectively locking the inner jacket 16 relative to the outer jacket 18 in the telescoping direction 23 and angular position of the steering column 14 in the raking direction 25, thereby preventing further adjustments of the steering wheel. It is to be appreciated that other suitable locking devices as known to those of ordinary skill in the art may be used for selectively preventing adjustments of the steering wheel instead of the cam-follower mechanism or the tilt-pin mechanism 64. The clamping force applied to the bracket 20 and/or the arms 26, the outer jacket 18 and the inner jacket 16 may be about 4000 N. It is to be appreciated that the clamping force may be higher or lower than 4000 N depending on the design requirements of the vehicle manufacturer.

The locking device 56 further includes a lever 66 mounted to the bolt 58 for allowing the driver to selectively adjust the steering wheel. The lever 66 is rotatable about the pivot axis "P" between a locked position for preventing adjustments of the steering wheel and an unlocked position for allowing adjustments of the steering wheel. When the lever 66 is in the locked position, the clamping force is applied to the bracket 20 and/or the arms 26, the outer jacket 18 and the inner jacket 16 for preventing adjustments of the steeling wheel. In other words, the bracket 20 and/or the arms 26 are clamped and squeezed together which clamps and squeezes the outer jacket 18 which in turn clamps and squeezes the inner jacket 16, thus preventing adjustments in the telescoping and raking directions 23, 25. Having the space 46 between the flanges 44 allows the first end 34 of the outer jacket 18 to flex or bend such that the flanges 44 move toward each other for squeezing the inner jacket 16 to prevent adjustments in the telescoping and raking directions 23, 25. When the lever 66 is in the unlocked position, the clamping force "F" is reduced or eliminated on the bracket 20 and/or the arms 26, the outer jacket 18 and the inner jacket 16 for allowing adjustments of the steering wheel in the telescoping and raking directions 23, 25.

The collapsible steeling column assembly 12 further includes a release mechanism 68 for allowing the inner jacket 16 to collapse within the outer jacket 18 when the predetermined force is achieved such that the energy absorbing device 10 absorbs energy. The release mechanism 68 may be any suitable release mechanism known to those of ordinary skill in the art for allowing the inner jacket 16 to collapse when the predetermined force is achieved during a collision. In the embodiment illustrated in the FIGS. and shown in FIG. 4, the release mechanism includes a tapered surface 69 of outer jacket 18 that engages a complementary tapered surface (not shown) of bracket 20 (not shown).

Movement of the locking device 56 between the locked and unlocked positions also causes the energy absorbing device 10 to be coupled and uncoupled, respectively. In other words, the locking device 56 and the energy absorbing device 10 cooperate with each other such that when the lever 66 is in the locked position; both the locking device 56 and the energy absorbing device 10 are in the locked position and vice versa. The details of how the locking device 56 and the energy absorbing device 10 cooperate with one another are discussed below.

Referring to FIGS. 2 and 3, the energy absorbing device 10 includes an energy absorbing strap 70 affixed to the outer jacket 18 and coupled to the inner jacket 16 such that when the inner jacket 16 collapses within the outer jacket 18, the strap 70 is pulled by the inner jacket 16 for absorbing energy. More specifically, the strap 70 is affixed to the second end 36 of the outer jacket 18 and the strap 70 is deformed as the strap 70 is pulled with the inner jacket 16 for absorbing energy.

Referring to FIGS. 2-7, the strap 70 includes a first portion 72 and a second portion 74 spaced from each other with the first portion 72 affixed to the distal end 32 of the inner jacket 16. The second portion 74 is disposed around an anvil or mandrel 73 that is attached to the distal end 32 of the inner jacket 16 and is releasably coupled to the first end 34 of outer jacket 18 as described herein. The second portion 74 has a plurality of teeth 76 for releasably coupling the second portion 74 to outer jacket 18. The strap 70 further includes a generally U-shaped portion 78 disposed around the anvil or mandrel 73 between the first and second portions 72, 74. Typically, the first and second portions 72, 74 are integrally formed with the U-shaped portion 78. It is to be appreciated that the first and second portions 72, 74 may be formed separately and joined to the U-shaped portion 78 by any suitable joint or joining method, including welding, the use of fasteners, etc.

Figure 6:
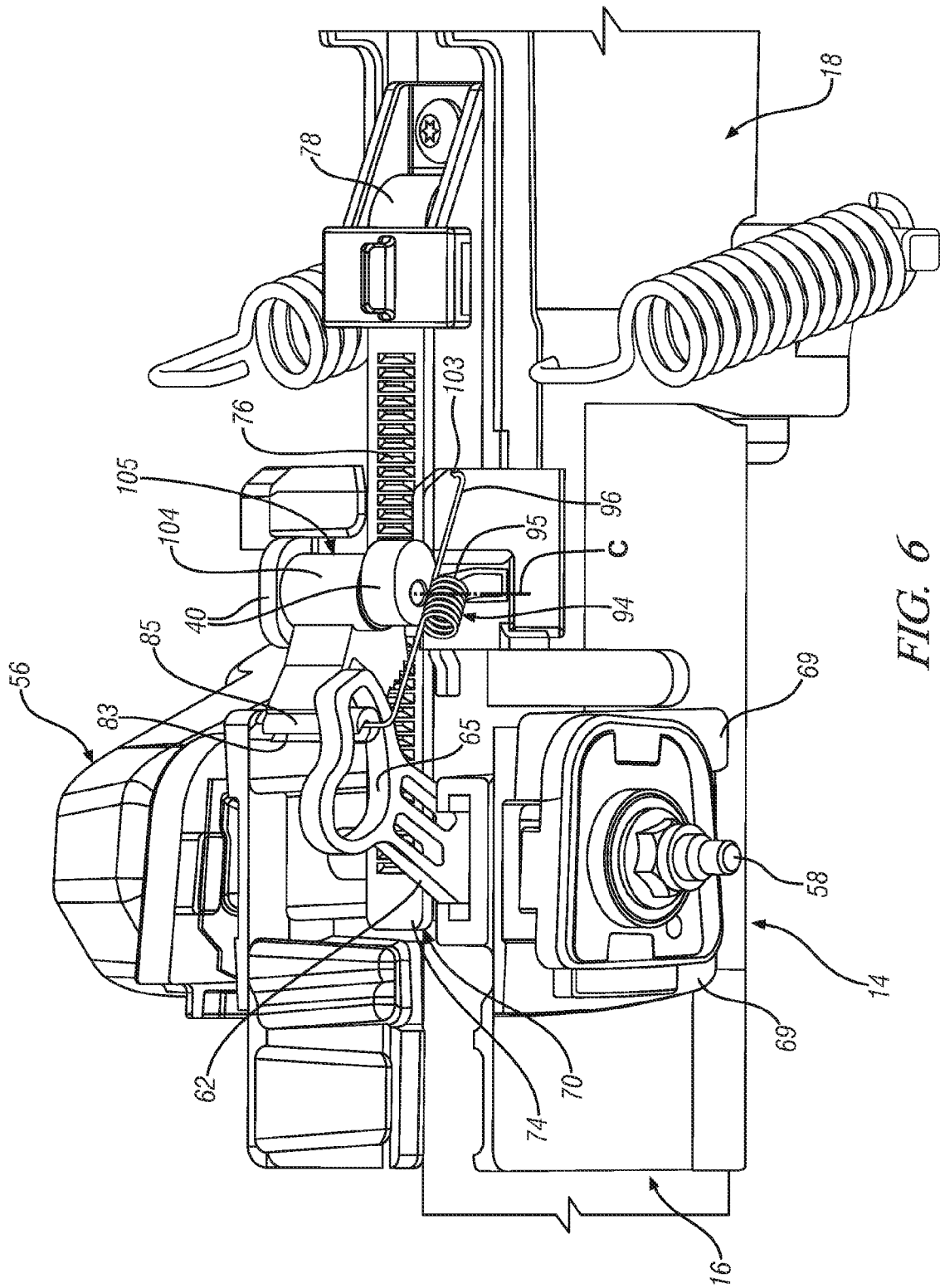
FIG. 6 is an enlarged perspective right side view of the assembly of FIG. 4 with the energy absorbing device in an unlocked position.

The energy absorbing device 10 further includes a selectively engageable, rotatable locking member 105 that is pivotally coupled to the legs 40 the bolt follower 60 and the bolt 58. In one exemplary embodiment, locking member 105 may include a rotatable locking cam 104 pivotally coupled to the legs 40 and the bolt follower 60. In one exemplary embodiment, lock member 105 may include a rotatable locking cam pivotally coupled to the legs 40 and the bolt follower 60. Referring to FIGS. 2-7, the locking cam 104 is shown in the locked position engaging the strap 70 for preventing adjustments of the inner jacket 16 (together with the locking device 56) in the telescoping direction 23 and for preventing movement of the strap 70 in the telescoping direction 23. In other words, when the locking cam 104 is in the locked position, the strap 70 is fixed between both the inner and outer jackets 16, 18. Referring to FIG. 6, the locking cam 104 is shown in the unlocked position spaced from the strap 70 for allowing movement of the strap 70 along the longitudinal axis "L" while the inner jacket 16 is adjusted in the telescoping direction 23, FIG. 1. In other words, when in the unlocked position, the strap 70 and the inner jacket 16 move together or simultaneously when the inner jacket 16 is adjusted in the telescoping direction 23 with the anvil or mandrel 73 always in the same position relative to the strap 70 prior to being deformed, preferably proximate the strap 70, and more preferably in touching contact with the strap 70. Having the strap 70, inner jacket 16 and anvil or mandrel 73 movable together when making adjustments in the telescoping direction allows the energy absorbing device 10 to absorb energy as soon as the inner jacket 16 begins to collapse within the outer jacket 18 instead of waiting to activate the energy absorbing device 10 until the inner jacket 16 collapses a predetermined distance within the outer jacket 18 as occurs in prior art energy absorption devices. In other words, the energy absorbing device 10 is designed to absorb energy at any telescoped position of the inner jacket 16 without first waiting for the inner jacket 16 to collapse the predetermined distance.

As shown in FIG. 7, the locking cam 104 includes a tail 80 on one end 81 thereof extending beyond the legs 40 of the outer jacket 18. The tail 80 also includes a spring recess 83 that extends transverse to the longitudinal axis "L" on the distal end 81. The locking cam 104 also includes a protruding cam follower arm 85. The locking cam 104 further includes a bottom surface 82 defining an eccentric cam profile configuration having a plurality of teeth 84 that are configured to selectively and lockingly engage the teeth 76 of the strap 70. More specifically, when the teeth 84 of the locking cam 104 engage the teeth 76 of the strap 70, the strap is pinched or clamped between the locking cam 104 and the base 38 of the outer jacket 18. It is to be appreciated that the tail 80, teeth 84 and protruding follower arm 85 may be integrally formed with the locking cam 104 or formed separately and affixed to the locking cam 104 by any suitable joint or joining method, including welding, the use of fasteners, etc.

Also referring to FIGS. 2 and 3, the energy absorbing device 10 also includes a rod 86 disposed through a pair of bores 41 in the legs 40 and through a bore 105 in the locking cam 104 for coupling the locking cam 104 to the outer jacket 18. The rod 86 defines a cam axis C transverse to the longitudinal axis "L" and also spaced from and substantially parallel to the pivot axis P with the locking cam 104 rotatable about the cam axis "C". The cam follower arm 85 protrudes outwardly and transverse to the longitudinal axis "L" from the locking cam 104 toward the arm 62 of the bolt follower 60 and is configured to nest within opening 63 and engage the sidewall 65 as a cam surface when the rake bolt 56 is rotated to lock and unlock the steering column 14 as described herein. The bolt follower 60, arm 62 and cam follower arm 85 comprise a mechanical linkage 87 between the bolt 56 and the locking cam 104 that mechanically links these members and is configured to convert rotation of the bolt 56 to produce rotation of the locking cam 104. Thus, rotation of the bolt 56 to provide unlocking and adjustment of the steering column 14 as described herein also provides rotation and unlocking of the locking cam 104 and the energy absorbing device 10 and vice versa with respect to locking of these members.

Referring to FIGS. 1-7, particularly FIGS. 6 and 7, the energy absorbing device 10 also includes a biasing member 94. The biasing member 94 provides a spring bias that constantly biases the locking cam 104 toward the strap 70. More specifically, the biasing member 94 provides a spring bias that constantly biases the teeth 84 of the locking cam 104 toward the teeth 76 of the strap 70 so that the cam is biased toward a locked position of the energy absorbing device 10. The mechanical linkage 87 may be used to provide a force to overcome the bias force of the bias member 94 by appropriate rotation of the bolt 56 so that the locking cam is forced away from the strap and the teeth 76 of the strap become disengaged from the teeth 84 of the locking cam 104 to provide an unlocked position of the energy absorbing device 10 (FIG. 6).

Counter-rotation of the bolt 56 to lock the steering column 14 will cause the linkage 87 members to move so that they no longer react to provide a force sufficient to overcome the bias of bias member 94 so that the energy absorbing device 10 returns to a locked position (FIG. 2-5). The locking device 56 is coupled to and may cooperate with the energy absorbing device 10 through linkage 87.

The biasing member 94 may include a coil spring 95 having a jacket end 96 that is configured to be attached to outer jacket 18, such as by a first hook 97, and a cam end 98 that is configured to be attached to locking cam 104, such as by a second hook 99. Cam end 98 is configured for disposition in the spring recess 83 and second hook 99 may a bore or slot 101 in the sidewall 102 of locking cam 104. The first hook 97 may also engage a suitable feature of outer jacket 18, such as recess 103 (FIG. 6).

It will be easily appreciated that the locking member 105, linkage 87 and biasing member 94 providing the functions described herein may have any suitable form, and may include any suitable combination of components, including both fewer and more components than those described herein, to provide the mechanical coupling, biasing and other functions described herein. For example, many different configurations of locking members 105 are contemplated, including that have a cam profile or shape and those that do not, but rather have the shape of an extended arm. The biasing member 94 may include any suitable type and shape of a coil spring or other resilient member that may be configured to bias the locking member 105 toward the strap 70. Similarly, any suitable form of linkage may be used to couple the bolt 56 to the energy absorbing device 10.

For illustrative purposes only, an example of the locking device 56 moving from the unlocked position to the locked position for preventing adjustments of the steering wheel will be discussed below to illustrate the locking device 56 cooperating with the energy absorbing device 10.

When the lever 66 is rotated into the unlocked position, the clamping force is reduced or eliminated between the bracket 20 and/or the arms 26, the outer jacket 18 and the inner jacket 16 for allowing the steering column 14 to be adjusted in the telescoping and/or raking directions. In addition, the teeth 84 of the locking cam 104 are disengaged from the teeth 76 of the strap 70 such that the strap 70 moves freely with the inner jacket 16 when the steering wheel is being adjusted in the telescoping direction. In other words, the strap 70 and the inner jacket 16 move together or simultaneously when the inner jacket 16 is adjusted in the telescoping direction due to the strap 70 being affixed to the end 32 of the inner jacket 16. Having the strap 70 and the inner jacket 16 movable together when adjusting the inner jacket 16 in the telescoping direction is very advantageous because it enables the strap to begin being deformed and to absorb energy as soon as the inner jacket 16 begins to collapse within the outer jacket 18 in response to an extreme impact event, such as a collision. This is in contrast to prior designs in which the strap and inner jacket are not moveable together which generally requires that the collapse of the inner jacket proceed sufficiently to close any predetermined separation distance between these members, thereby delaying the activation of, or reducing the energy absorption capability of, the energy absorbing device 10 until the inner jacket 16 collapses the predetermined distance within the outer jacket 18.

When the lever 66 rotates about the pivot axis "P" to the unlocked position from the locked position, the bolt 58, bolt follower 60 and arm 62 rotate about the pivot axis "P" in a first direction. As the arm 62 rotates, the sidewall 65 engages the protruding arm 85 and the linkage 87 that includes these elements provides a lifting force which acts on the locking cam 104 to overcome the downward bias of the biasing member 94, thereby causing the locking cam 104 to be lifted sufficiently for the teeth 84 of the locking cam to become disengaged from the teeth 76 of the strap 70, thereby unlocking the energy absorbing device 10.

When the lever 66 counter-rotates about the pivot axis "P" to the locked position from the unlocked position, the bolt 58, bolt follower 60 and arm 62 rotate about the pivot axis "P" in a second direction. As the arm 62 counter-rotates, the sidewall 65 disengages from the protruding arm 85 and the linkage 87 that includes these elements no longer provides a lifting force which acts on the locking cam 104 to overcome the downward bias of the biasing member 94. Therefore, the downward bias of biasing member 94 forces the teeth 84 of the locking cam to engage the teeth 76 of the strap 70, thereby locking the energy absorbing device 10.

The teeth 84 of the locking cam 104 engage the teeth 76 of the strap 70 such that the second portion 74 of the strap 70 is pinched or clamped between the locking cam 104 and the base 38 of the outer jacket 18 as shown in FIGS. 2 and 3. When the lever 66 is in the locked position, the second position 74 of the strap 70 is fixed relative to the outer jacket 18 and the first portion 72 of the strap 70 is fixed relative to the inner jacket 16 such that when the inner jacket 16 collapses within the outer jacket 18, the first portion 72 travels with the inner jacket 16 and the strap 70 is pulled or deformed for absorbing energy.

Referring to FIGS. 2 and 3, for illustrative purposes only, an example of the steering column 14 moving from the pre-collapse position to the post-collapse position in response to an extreme impact on the proximal end 30, such as may occur in a collision, will be discussed below to illustrate the inner jacket 16 collapsing within the outer jacket 18 with the energy absorbing device 10 absorbing energy. FIG. 2 illustrates the steering column 14 in the pre-collapse position and FIG. 3 illustrates the steering column 14 in the post-collapse position.

When the locking device 56 is in the locked position for preventing adjustments of the steering wheel, the energy absorbing device 10 is also in the locked position. More specifically with regards to the energy absorbing device 10, the teeth 84 of the locking cam 104 are engaging the teeth 76 of the strap 70. When the locking cam 104 is in the locked position, the strap 70 is fixed between both the inner and outer jackets 16, 18. When the predetermined force is applied to the inner jacket 16, the inner jacket 16 collapses within the outer jacket 18. As soon as the inner jacket 16 begins to collapse within the outer jacket 18, the energy absorbing device 10 begins to absorb energy. The strap 70 is pulled with the inner jacket 16 as the inner jacket 16 travels through the outer jacket 18, thereby absorbing energy associated with the force applied to the proximal end. More specifically, the first portion 72 of the strap 70 deforms and becomes longer than the second portion 74 of the strap 70 as the strap 70 is pulled between the inner and outer jackets 16, 18 while absorbing energy. Pulling of the first portion 72 causes pulling of the second portion 74 which allows the teeth 76 of the strap 70 to further engage the teeth 84 of the locking cam 104 due to the eccentric cam configuration of the locking cam 104. More specifically, the pulling of the second portion 74 causes the locking cam 104 to further rotate about the cam axis C which allows more teeth 84 of the locking cam 104 to engage more teeth 76 of the strap 70 and thus increases the force clamping or pinching of the strap 70 between the locking cam 104 and the base 38. It is to be appreciated that more rotation of the lever 66 about the pivot axis "P" to lock the device allows more rotation of the bolt follower 60 and the arm 62 bringing them out of contact with protruding arm 85, which causes the biasing member 94 to increase the force applied to the locking cam 104 about the cam axis "C", which in turn causes more teeth 84 of the locking cam 104 to engage the teeth 76 of the strap 70 to clamp or pinch the strap 70 between the locking cam 104 and the base 38 to a greater degree.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the present application.

What is claimed is:

1. A collapsible steering column assembly, comprising:
    a column mounting bracket configured for mounting to a vehicle, the bracket having a front portion and a back portion, the front portion comprising a pair of spaced arms, each arm having an inner surface that opposes the inner surface of the other arm and an opposed outer surface;
    a steering column having a longitudinal axis and comprising an inner jacket that is slidably disposed within an inner surface of an outer jacket, an outer surface of the outer jacket located adjacent the inner surfaces of the spaced arms;
    a locking device that passes through and is coupled to the spaced arms and the outer jacket, the locking device movable to lock or unlock the slidable disposition of the inner jacket within the outer jacket by respective application or release of a predetermined clamping force to the outer surfaces of the arms, the outer jacket and the inner jacket; and
    an energy absorbing device comprising an energy absorbing strap that is fixed to the inner jacket at a first portion thereof and slidably disposed within the outer jacket.

2. The steering column assembly of claim 1, wherein the energy absorbing device further comprises an anvil disposed on the inner jacket, the anvil disposed proximate the first portion of the strap and configured to engage the strap upon collapse of the inner jacket within the outer jacket.

3. The steering column assembly of claim 2, wherein the energy absorbing device further comprises a locking member that is disposed on the outer jacket, a second portion of the strap located proximate the locking member, the locking member selectively engageable to lock the second portion of the strap with respect to the outer jacket.

4. The steering column assembly of claim 3, wherein the locking member comprises a plurality of teeth and the second portion of the strap comprises a plurality of teeth that are disposed proximate the locking member, and wherein the selective engagement of the teeth of the locking member and the teeth of the strap locks the second portion of the strap with respect to the outer jacket.

5. The steering column assembly of claim 2, wherein the energy absorbing device further comprises a bias member and a linkage, the bias member providing a bias force urging the locking member into engagement with the second portion of the strap, the linkage coupled to the locking device and the locking member and configured to overcome the bias force and unlock the locking member and the strap in conjunction with unlocking of the inner jacket and outer jacket and to lock the locking member and the strap in conjunction with locking of the inner jacket and the outer jacket.

6. The steering column assembly of claim 5, wherein the locking device comprises a rotatable bolt to lock and unlock movement of the steering column.

7. The steering column assembly of claim 6, wherein the bias member comprises a coil spring and the linkage comprises a bolt follower that is disposed on the bolt.

8. The steering column assembly of claim 3, wherein the strap has a U-shaped portion between the first portion and the second portion.

9. The steering column assembly of claim 6, wherein the steering column is movable in a telescoping direction and a raking direction.

10. The steering column assembly of claim 1, wherein the locking device is configured to lock or unlock movement of the steering column in the telescoping direction and the raking direction.

11. A collapsible steering column assembly, comprising:
a column mounting bracket configured for mounting to a vehicle, the bracket having a front portion and a back portion, the front portion comprising a pair of spaced arms, each arm having an inner surface that opposes the inner surface of the other and an opposed outer surface;
a steering column having a longitudinal axis and comprising an inner jacket that is slidably disposed within an inner surface of an outer jacket, an outer surface of the outer jacket located adjacent the inner surfaces of the spaced arms;
a locking device that passes through and is coupled to the spaced arms and the outer jacket, the locking device movable to lock or unlock the slidable disposition of the inner jacket within the outer jacket by respective application or release of a predetermined clamping force to the outer surfaces of the arms, the outer jacket and inner jacket; and
an energy absorbing device comprising an energy absorbing strap that is fixed to the inner jacket at a first portion thereof and slidably disposed within the outer jacket, an anvil disposed on the inner jacket, the anvil disposed proximate the first portion of the strap and configured to engage the strap upon collapse of the inner jacket within the outer jacket, a locking member that is disposed on the outer jacket, a second portion of the strap located proximate the locking member, the locking member selectively engageable to lock the second portion of the strap with respect to the outer jacket and a bias member providing a bias force urging the locking member into engagement with the second portion of the strap.

12. The steering column assembly of claim 11, further comprising a linkage, the bias member providing a bias force urging the locking member into engagement with the second portion of the strap, the linkage coupled to the locking device and the locking member and configured to overcome the bias force and unlock the locking member and the strap in conjunction with unlocking of the inner jacket and outer jacket and lock the locking member and the strap in conjunction with locking of the inner jacket and the outer jacket.

13. The steering column assembly of claim 12, wherein the locking device comprises a rotatable bolt to lock and unlock movement of the steering column.

14. The steering column assembly of claim 13, wherein the bias member comprises a coil spring and the linkage comprises a bolt follower that is disposed on the bolt.

15. The steering column assembly of claim 14, wherein the locking member comprises a rotatable locking cam having a follower arm protruding toward and engaging the bolt follower.

16. The steering column assembly of claim 15, wherein the bolt follower has a radially extending arm having an opening therein, the opening having a sidewall, and the follower arm extends within the opening and is configured to engage the sidewall, and the coil spring is attached on one end to the outer jacket and has an arm that extends through the opening and is attached on another end to the rotatable locking cam.

17. The steering column assembly of claim 16, wherein the rotatable locking cam comprises a plurality of teeth and the second portion of the strap comprises a plurality of teeth that are disposed proximate the teeth of the rotatable locking cam, and wherein the teeth of the locking member and the teeth of the strap may be selectively engaged to lock the second portion of the strap with respect to the outer jacket.

18. The steering column assembly of claim 11, wherein the assembly is attached to a vehicle.

* * * * *